Oct. 13, 1959 D. K. SCHAEVE 2,908,829
CONTROL SYSTEM WITH STEPPED OUTPUT TRANSISTOR AMPLIFIER
Filed March 8, 1956
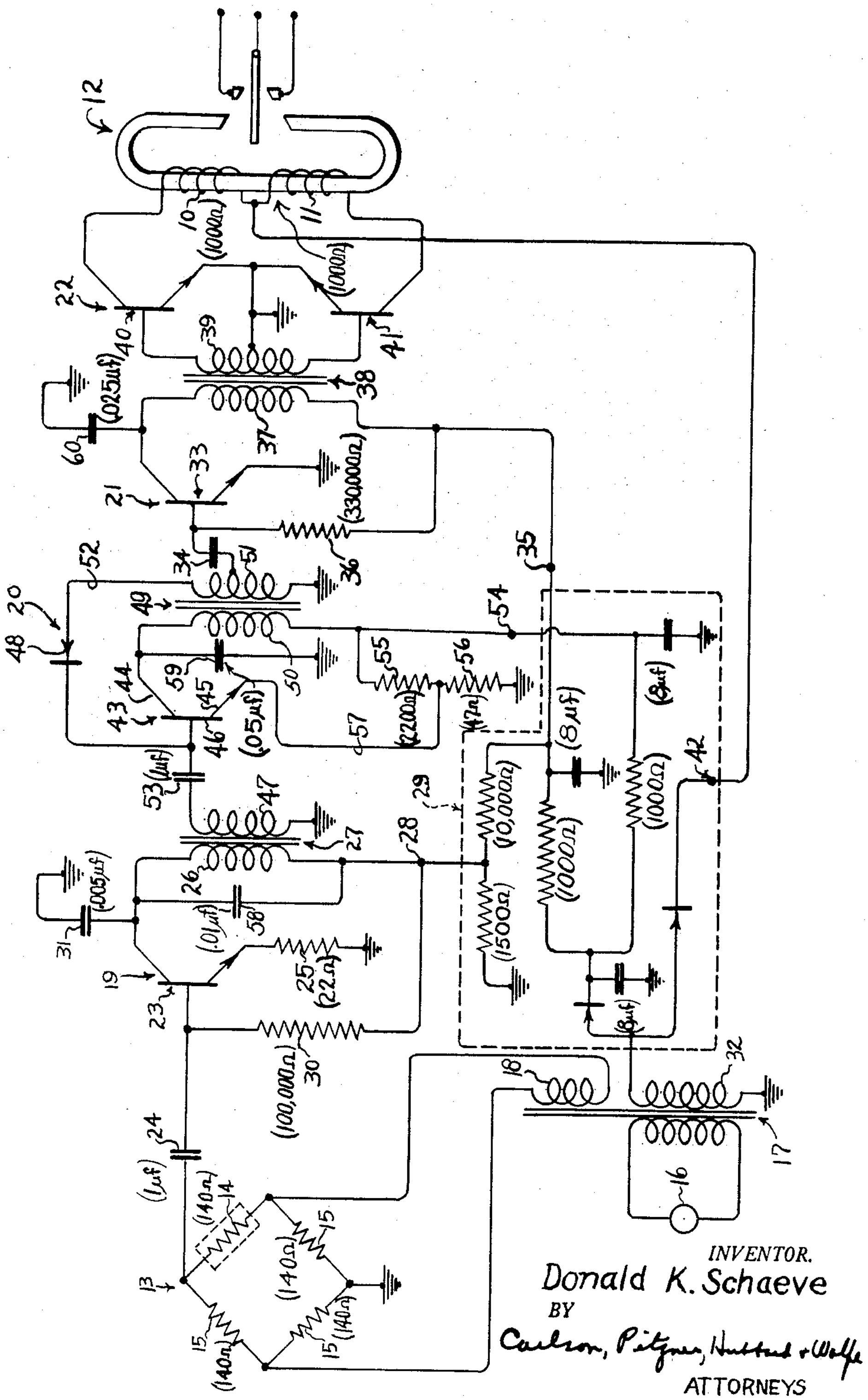
INVENTOR.
Donald K. Schaeve
BY
Carlson, Pitzner, Hubbard & Wolfe
ATTORNEYS 2,908,829
Patented Oct. 13, 1959

2,908,829

CONTROL SYSTEM WITH STEPPED OUTPUT TRANSISTOR AMPLIFIER

Donald K. Schaeve, Rockford, Ill., assignor to Barber-Colman Company, Rockford, Ill., a corporation of Illinois Application March 8, 1956, Serial No. 570,320
11 Claims. (Cl. 307—88.5)

This invention relates generally to control apparatus which is sensitive to variations of a slowly changing alternating current input signal and, more particularly, to apparatus including a transistor amplifier for controlling the energization of a load device such as a relay in response to variations in the amplitude of the signal.

The primary object of the invention is to construct the transistor amplifier in a novel manner to vary its output signal abruptly between high and low levels in response to gradual changes in the amplitude of the input signal while preserving the phase relation of the input and output signals and avoiding oscillations tending to reduce the stability of the amplifier.

Another object is to achieve the foregoing object by applying to the amplifier input circuit a continuous unidirectional bias of a magnitude proportional to the amplitude of the output signal.

A more detailed object is to derive the continuous unidirectional bias from the output signal through the provision of a unidirectional feedback circuit and a cooperating energy storage device.

The invention also resides in the novel manner of isolating the feedback circuit from the direct current potential source of the amplifier output circuit and from direct current potentials of the parts which transmit the input signal to the amplifying transistor.

Other objects and advantages of the invention will become apparent from the following detailed description taken in connection with the accompanying drawing which is a circuit diagram of a control system embodying the novel features of the present invention.

The invention is shown in the drawing for purposes of illustration embodied in a control system for energizing the coils 10 and 11 of a polarized relay 12 selectively in response to changes in phase and amplitude of an alternating current control signal. In this instance, the signal is derived from a bridge 13 formed by a temperature sensitive variable resistor 14 and three fixed resistors 15 and supplied with alternating current from a source 16 through a transformer 17 having a secondary winding 18 connected across the bridge input terminals. The control signal appearing across the output terminals of the bridge varies in amplitude with changes in the temperature of the sensing resistor 14 from a balance point and is in or out of phase with the alternating input current depending on the direction of variation from the balance point.

From the bridge 13, the control signal is transmitted successively through a preamplifier 19, a threshold amplifier 20, and a booster amplifier 21 to raise the signal power level. Then the signal is applied to a phase discriminator 22 which supplies current to one or the other of the relay coils 10 and 11 depending on the phase of the signal. The preamplifier 19 comprises a transistor 23 having its base connected to one output terminal of the bridge through a direct current blocking capacitor 24 and its emitter connected to the other bridge output terminal through a stabilizing resistor 25 and ground thereby completing the input circuit of the amplifier. The output circuit extends from the collector of the transistor through an output impedance element 26, herein, the primary winding of a coupling transformer 27, to a positive terminal 28 of a suitable direct current power supply 29, through the latter to ground, and from ground to the emitter through the stabilizing resistor 25. The base of the transistor is connected through a bias resistor 30 to the same supply terminal 28. Operation of the transistor is further stabilized by conecting the collector to ground through a capacitor 31. Herein, the power supply 29 derives its current from another secondary 32 of the power transformer 17.

The booster amplifier 21 is similar in construction to the preamplifier 19 with a transistor 33 having its base coupled to the threshold amplifier by a capacitor 34 and connected to a positive terminal 35 of the power supply 29 by a bias resistor 36. The collector of the transistor is connected to the power supply terminal 35 through the primary winding 37 of an output transformer 38. Opposite ends of the secondary winding 39 of the latter are connected to the respective bases of two transistors 40 and 41 acting as phase detectors in the discriminator 22 with their emitters connected together and to a grounded center tap of the secondary so that the signals applied to the bases are out of phase with each other. The relay coils 10 and 11 are connected in series between the collectors of the detector transistors and the junction between the coils is connected to a tap 42 of the power supply providing half wave rectified current in phase with the alternating current supplied to the bridge. Thus, an amplified control signal of one phase applied to the primary of the discriminator transformer 38 results in conduction by only one of the detector transistors and energization of the associated relay coil while conduction in the other transistor is blocked and the other coil is deenergized. When the amplified control signal is of the opposite phase, the other coil is energized and the first coil is deenergized.

In control systems of the above character utilizing a load device such as the relay 12, it is desirable that the amplified output signal of the system change abruptly between high and low levels in which the relay respectively is fully energized and is fully deenergized so as to achieve a positive action of the relay and avoid chatter or arcing of the relay contacts. This is accomplished in accordance with the present invention by a novel construction of the threshold amplifier 20 which not only provides an abruptly stepped output signal in response to an input signal of slowly changing magnitude, but also, preserves the phase of the amplified signal with respect to the input signal transmitted from the preamplifier 19. To these ends, a unidirectional feedback signal derived from the amplified output signal of the threshold amplifier and varying in magnitude in accordance with changes of the output signal is utilized to vary the input impedance of the amplifier and thereby the degree of its response to the input signal, the direction of change of the input impedance being opposite to the direction of change of the output signal amplitude.

The improved threshold amplifier 20 generally comprises a transistor 43 having an output circuit extending between an output electrode 44 and a common electrode 45, herein, the collector and emitter respectively, and an input circuit extending between the common electrode and the base or input electrode 46. To render the input impedance of the transistor and therefore of the amplifier sensitive to the unidirectional feedback signal, the impedance of the amplifier input circuit preferably is of a relatively low value. In this instance, such low value is obtained with isolation of the threshold amplifier from direct current potentials of the preamplifier 19 by coupling the output circuit of the latter to the input circuit of the threshold amplifier through the transformer 27. For this purpose, the transformer secondary winding 47 is connected between ground and the base 46 of the threshold transistor, this winding thus constituting an impedance element connected in the amplifier input circuit for applying the input signal thereto.

To obtain amplifier action by the threshold transistor 43 with the output signal varying in amplitude with changes in the alternating current input signal, a unidirectional potential is applied in the output circuit to bias the collector 44 in a nonconductive direction, such bias in the present instance being derived from the power supply 29. The unidirectional feedback signal for varying the input impedance of the transistor is transmitted through a circuit coupling the input and output circuits and including a rectifier 48 polarized to pass current in a direction to reduce the impedance of the transistor 43 to incoming signals to be amplified. To isolate the feedback circuit from the power supply 29 and avoid direct current flow between the latter and the base 46, the feedback circuit is coupled to the output circuit through an element 49 adapted to transmit the output signal while blocking the flow of direct current. This element, in the present instance, is a transformer having a primary winding 50 connected in the amplifier output circuit in series with the collector 44 and a secondary winding 51 grounded at one end with an intermediate tap connected to the base of the booster transistor 33 through the capacitor 34. The other end of the secondary winding is connected directly to the rectifier by a conductor 52.

With the parts of the threshold amplifier 20 described thus far, the signal transmitted to the input circuit through the feedback rectifier 48 is a pulsating direct current composed of alternating half cycles of the current induced in the secondary winding 51 of the amplifier output transformer 49. To utilize such current to vary the transistor input impedance for abrupt stepping of the output signal, a portion of the energy of each feedback pulse is stored for delivery between that pulse and the next pulse so that the input circuit is biased conductively by a continuous unidirectional voltage of a magnitude proportional to the amplitude of the output signal. Such energy is stored in this instance in a capacitor 53 connected in series with the input transformer secondary 47 between the latter and the base 46 of the threshold transistor 43. The feedback circuit then is coupled to the input circuit between the base and the capacitor so that the latter, in addition to storing energy from successive feedback pulses, blocks leakage of such pulses to ground through the low impedance of the input secondary winding 47.

The amplitude of potential of a conductive polarity required between the base 46 and emitter 45 of the threshold transistor 43 to produce conduction by the latter is determined by the cut-off characteristics of the transistor and the amount of external nonconductive bias applied to the input circuit. In this instance, the transistor is of the silicon type requiring a small conductive potential on the order of .6 of a volt between its input electrodes for conduction. Also, an external nonconductive bias is applied between the input electrodes 45 and 46. Thus, conduction by the threshold transistor occurs in response to a conductive potential in the input circuit larger than the sum of this inherent bias of the silicon transistor and the external bias between the input electrodes.

The external nonconductive bias between the input electrodes 45 and 46 of the threshold transistor 43 is derived herein from the power supply 29 through a voltage divider connected between ground and another terminal 54 of the supply and comprising two series resistors 55 and 56 whose common junction is connected directly to the emitter 45 by a conductor 57. The relative values of the resistors determine the amount of the nonconductive bias, one resistor 56 being substantially smaller than the other resistor 55 and completing the input circuit which extends from the emitter 45 through the resistor 56 to ground and from ground to the base 46 through the input transformer secondary 47 and the energy storage capacitor 53. The unidirectional potential of the same power supply tap 54 is utilized for biasing the collector 44 in a nonconductive direction by connecting the output transformer primary 50 to this tap. The output circuit of the amplifier then extends from the collector through the primary 50 and the power supply to ground and from ground to the emitter through the small divider resistor 56. The values of bias are correlated with the other elements of the system to provide current suitable for energizing the respective coils 10 and 11 and effecting pull-in of the relay 12 when the threshold input signal exceeds the predetermined control value determined by the inherent bias of the transistor and external bias of the resistor 56, this bias blocking such relay operating current when the input signal is below the control value.

In the operation of the improved control system described above, let it be assumed that power is available at the alternating current source 16 and that the sensing resistor 14 is near enough to its balance value that the amplitude of the signal applied to the threshold input circuit is less than that required to overcome the inherent bias of the threshold transistor 43 and the external nonconductive bias of the divider resistor 56. The transistor then is in a nonconductive state with substantially no current flowing in the threshold output circuit and with both relay coils 10 and 11 deenergized. As the amplitude of the threshold input signal increases gradually and exceeds the nonconductive bias to produce a current flow in the threshold input circuit, a corresponding amplified current flows in the primary winding 50 of the output transformer 49. Successive peaks of the output signal across the secondary winding 51 are detected by the feedback circuit and a current flows through the latter in a direction to apply a conductive bias in the threshold input circuit. Where the threshold transistor 43 is of the n-p-n type as all of the transistors in this instance, conductive bias conditions exist in the input circuit when the base 46 is positive with respect to the emitter 45. To obtain such potential relationship, the rectifier 48 is polarized for feedback current flow externally of the threshold transistor from the emitter 45 to the base 46 through the divider resistor 56, ground, the output secondary winding 51, and the rectifier.

During each pulse of the feedback current, a portion of the energy is stored in the capacitor 53 for maintaining on the base 46 of the threshold transistor 43 the substantially continuous conductive bias of a magnitude proportional to the amplitude of the output signal. A change of such bias produces a corresponding variation of the internal current flow between the base and the emitter 45 and an inverse variation of the impedance presented by the transistor to input signals appearing across the input transformer secondary 47. Thus, where the threshold input signal is increasing in amplitude and the transistor has just begun to conduct, the first feedback pulse from the first output signal pulse reduces the input impedance of the transistor so that the next output pulse is proportionately larger for the same input signal amplitude. The next feedback pulse and the conductive bias then are correspondingly larger to increase the amplitude of the next output pulse still farther. Such action is cumulative so that, after a few cycles during which the amplitude of the input signal changes little, if any, the transistor is in its fully conductive state with one of the relay coils 10 and 11 energized depending on the direction of deviation of the sensing resistor 14 from its balance value.

The action of the threshold transistor 43 in reaching the fully conductive state is especially fast because of the characteristic of the transistor that its input impedance varies as a nonlinear function of the unidirectional conductive current flow between its input electrodes. In other words, a change of this current a given amount when the current is of a relatively low value such as during initial conduction by the transistor will produce a larger change of input impedance than the same change of current when the latter is of a higher value such as during full conduction by the transistor.

This nonlinear relation of the input impedance and the unidirectional current between the input electrodes 45 and 46 of the threshold transistor 43 also is utilized to advantage to change the transistor rapidly from the fully conductive state to the nonconductive state in response to a threshold input signal of slowly decreasing amplitude. For this purpose, the size of the energy storage capacitor 53 is correlated with the resistance of its discharge circuits so that the time constant, while being long enough to retain a charge on the capacitor from one feedback pulse to the next, also is short enough to permit the feedback bias to follow a decrease of output signal amplitude upon a decrease of the amplitude of the input signal.

When the threshold transistor 43 is in the fully conductive state and the input signal amplitude begins to decrease, the output signal amplitude also drops resulting in a smaller feedback pulse. The energy from this pulse stored in the capacitor 53 being smaller than that of the previous pulse, the level of feedback bias drops and the input impedance of the threshold transistor increases. The next output pulse and the corresponding feedback pulse then will be smaller even though the amplitude of the input signal on its next cycle remains substantially the same. This action again is cumulative and the transistor changes into the nonconductive state for deenergization of both relay coils 10 and 11 within a few cycles after the magnitude of the feedback pulses begins to drop.

In one control system constructed as described above and utilizing circuit elements having the values indicated on the drawing, it was found that rapid action was achieved in response to both increases and decreases of the threshold input signal amplitude with values of the energy storage capacitor 53 from .75 of a microfarad to 2 microfarads. Below a value of .75 of a microfarad, however, the phase of the output signal shifted relative to the input signal so as to interfere with operation of the phase discriminator 22, values above 2 microfarads resulting in slowed response to decreasing input signals. Silicon transistors were used throughout, the amplifier transistors 23, 33 and 43 being type 903 and the phase detectors 40 and 41 being type 953 all manufactured by Texas Instruments, Incorporated of Dallas, Texas. An alternating current source 16 of 115 volts, 400 cycles per second was used with the bridge input secondary 18 and the direct current supply secondary 32 respectively supplying 6.3 volts and 30 volts. Each of the threshold and booster output transformers 49 and 38 was a type O9 transformer manufactured by United Transformer Corporation of New York, New York and the threshold input transformer 27 was a type SSO3 transformer manufactured by the same company. To assist in maintaining the phase of the amplified signal in relation to the signal of the bridge 13 for proper operation of the phase discriminator 22, it was preferred to connect capacitors 58, 59 and 60 of the values shown across the primary winding 26 of the threshold input transformer 27 and between ground and the respective collectors of the threshold and booster transistors 43 and 33.

It will be apparent from the foregoing that the amplified output signal of the threshold amplifier 20 steps abruptly between high and low values for positive and fast action of the relay 12 in response to gradual changes in the input signal amplitude. This advantageous result is obtained without any tendency of the amplifier to go into oscillations because of the unidirectional character of the feedback signal, the latter also making it possible to maintain the phase relation between the threshold input and output signals. By virtue of the abruptly stepped threshold output signal, a large power output may be obtained from the transistors in subsequent stages, particularly the detector transistors 40 and 41, because these transistors pass between their nonconductive and fully conductive states so quickly that their operation during the transition may be in regions of excessive collector dissipation without injury to the transistors.

I claim as my invention:

1. In a system for controlling the energization of a load device in response to variations in amplitude of an alternating current input signal, the combination of, a transistor amplifier having an input circuit extending between input and common electrodes and an output circuit extending between the common electrode and an output electrode, said input circuit including a capacitor connected to said input electrode, an input transformer having a primary winding adapted for connection to a source providing said input signal and a secondary winding connected in said input circuit with said capacitor to apply the signal to said input electrode through said capacitor, a source of unidirectional current connected in said output circuit to bias said output electrode to provide an alternating current output signal whose amplitude varies in accordance with changes in the amplitude of said input signal and with changes in the magnitude of unidirectional conductive bias applied to said input electrode, an output transformer having a primary winding connected in said output circuit and a secondary winding adapted to be coupled to said load device for transmitting said output signal thereo, and a direct current feedback circuit connected between said input electrode and said output secondary winding and having a rectifier polarized to pass current unidirectionally to apply a conductive bias to the input electrode, said capacitor blocking direct current flow through said input secondary winding and said feedback circuit and cooperating with the latter to apply to said input electrode a unidirectional conductive bias of a magnitude proportional to the amplitude of said output signal.

2. In a system for controlling the energization of a load device in response to variations in amplitude of an alternating current input signal, the combination of, a transistor amplifier having an input circuit extending between input and common electrodes and an output circuit extending between the common electrode and an output electrode, said input circuit including a capacitor connected to said input electrode, an input transformer having a primary winding adapted for connection to a source providing said input signal and a secondary winding connected in said input circuit with said capacitor to apply the signal to said input electrode through said capacitor, a source of unidirectional current connected in said output circuit to bias said output electrode to provide an alternating current output signal whose amplitude varies in accordance with changes in the amplitude of said input signal and with changes in the magnitude of unidirectional conductive bias applied to said input electrode, coupling means connected to said output circuit and adapted to transmit said alternating output signal while blocking the flow of direct current to said load device, and a feedback circuit connected to said input circuit between said capacitor and said input electrode and to said output circuit through said coupling means and having a rectifier polarized to pass current in a direction to bias said input electrode conductively, said capacitor blocking the flow of direct current through said secondary winding and said feedback circuit and cooperating with the latter to apply to said input electrode a unidirectional conductive bias of a magnitude proportional to the amplitued of said output signal.

3. In a system for controlling the energization of a load device in response to changes in the amplitude of an alternating current input signal, the combination of, a source of variable amplitude alternating current providing said signal, a transistor having an input circuit connected to said source to receive said input signal therefrom and an output circuit providing an amplified alternating current output signal variable in amplitude in accordance with changes in said input signal and changes in unidirectional conductive bias applied to said input circuit, said transistor blocking said output signal when the amplitude of said input signal is below a predetermined value, means connected to said output circuit for coupling the latter to said load device and adapted to pass said output signal while blocking the flow of direct current, a feedback circuit connecting said input circuit to said output circuit through said coupling means and including a rectifier polarized to pass current to bias said input electrode conductively and to block current in the opposite direction, and a capacitor connected to said input circuit and storing energy from each pulse of current through said feedback circuit for delivery to the input circuit between successive pulses, said feedback circuit and said capacitor cooperating to apply to said input circuit a continuous unidirectional conductive bias proportional to the amplitude of said output signal, the input impedance of said transistor varying inversely with the unidirectional conductive bias derived from said feedback circuit to cause the amplitude of said output signal to change abruptly through a wide range in response to a gradual change in the amplitude of said input signal above said predetermined value.

4. In a system for controlling the energization of a load device in response to gradual changes in the amplitude of an alternating current signal of an input source, the combination of, a transistor having an input circuit extending between an input electrode and a common electrode and an output circuit extending between the common electrode and an output electrode, an input impedance element coupling said input electrode to said source for applying said signal to said input circuit, a source of unidirectional current connected to said output electrode to provide an amplified alternating current output signal variable in amplitude in accordance with changes in said input signal and changes in unidirectional conductive bias applied to said input circuit, said transistor blocking said output signal when the amplitude of said input signal is below a predetermined value, means connected to said output circuit for coupling the latter to said load device and adapted to pass said output signal while blocking the flow of direct current, a direct current feedback circuit connecting said input electrode to said output circuit through said coupling means and including a rectifier polarized to pass current to bias said input electrode conductively and to block current in the opposite direction, and an energy storage device connected to said input electrode and cooperating with said feedback circuit to apply to the input electrode a unidirectional conductive bias proportional to the amplitude of said output signal, the input impedance of said transistor varying inversely with changes in said unidirectional bias derived from said feedback circuit to cause the amplitude of said output signal to change abruptly through a wide range in response to a gradual change in the amplitude of said input signal above said predetermined value.

5. In a system for controlling energization of a load device in response to gradual changes in the amplitude of an alternating current input signal, the combination of, a transistor having an input circuit extending between input and common electrodes and an output circuit extending between the common electrode and an output, a source of variable amplitude alternating current providing said signal, said input circuit including an impedance element coupled to said source for applying said input signal to the circuit and an isolating element coupling the impedance element to said input electrode and adapted to transmit the input signal to the input electrode while blocking unidirectional current, a source of unidirectional current connected in said output circuit and biasing said output electrode to provide an amplified alternating current output signal variable in amplitude with changes of said input signal and changes of unidirectional conductive bias applied between said input and common electrodes, said transistor blocking said output signal when the amplitude of said input signal is below a predetermined value, coupling means connected to said output circuit and adapted to transmit said output signal while blocking the flow of direct current to said load device, and bias means including a feedback circuit connected to said input circuit between said input electrode and said isolating element and applying to the electrode a unidirectional conductive bias derived from and varying directly with said output signal, the input impedance of said transistor varying inversely with changes of said conductive bias derived from said bias means to provide an abrupt change in the amplitude of the output signal in response to a gradual change in the amplitude of said input signal above said predetermined value.

6. In a system for controlling the energization of a load device in response to gradual changes in the amplitude of an alternating current signal of an input source, the combination of, a transistor amplifier having an input circuit and an output circuit, an impedance element coupling said input circuit to said source for applying said signal to the circuit, a bias source of unidirectional current connected in said output circuit to provide an amplified alternating current output signal varying in amplitude in accordance with changes in said input signal and changes in conductive bias applied to said input circuit, coupling means connected to said output circuit and adapted to transmit said output signal and to block direct current flow to said load device, means connected to said input circuit and applying a nonconductive bias of a fixed magnitude for blocking current flow in said output circuit when the amplitude of said input signal is below such magnitude, and means for applying a unidirectional conductive bias in said input circuit in opposition to said nonconductive bias and varying the magnitude of the conductive bias in accordance with changes in the amplitude of said output signal, said conductive bias means including a direct current feedback circuit connected to said output circuit through said coupling means.

7. In a system for controlling the energization of a load device in response to changes in the amplitude of an alternating current signal of an input source, the combination of, a transistor having an input circuit and an output circuit, an impedance element coupling said input circuit to said source for applying said signal to the circuit, a bias source of unidirectional current connected in said output circuit to provide an amplified alternating current output signal varying in amplitude in accordance with changes in said input signal and changes in conductive bias applied to said input circuit, said transistor blocking said output signal when the amplitude of said input signal is below a predetermined value, means connected to said output circuit for coupling the latter to said load device and adapted to pass said alternating current output signal while blocking the flow of direct current, and bias means including a feedback circuit between said coupling means and said input circuit and applying to the latter a unidirectional conductive bias derived from and variable directly with changes in said output signal, the input impedance of said transistor varying inversely with changes of said conductive bias derived from said bias means to cause the amplitude of said output signal to change abruptly in response to gradual changes in the amplitude of said input signal above said predetermined value.

8. In a control system responsive to an alternating current input signal of variable phase and amplitude, the combination of, phase sensitive load means adapted to respond to currents of different phases having amplitudes larger than a predetermined operating value, a threshold amplifier comprising a transistor having an input circuit and an output circuit, a source of alternating current providing said signal and coupled to said input circuit to apply the signal to the circuit, said transistor providing an alternating current output signal in response to input signals having amplitudes above a predetermined control value, phase detecting means coupled between said output circuit and said load means for transmitting said output signal to the latter, and means including a direct current feedback circuit and applying to said input circuit a unidirectional conductive bias of a magnitude proportional to the amplitude to said output signal, the input impedance of said transistor varying inversely with changes in said conductive bias to cause the amplitude of the current applied to said load means by said detecting means to change through said operating value rapidly in response to gradual changes of the amplitude of said input signals through said control value.

9. In a control system adapted to respond to an alternating current input signal of variable amplitude, the combination of, a source of alternating current providing said signal, a transistor having an input circuit coupled to said source to receive said input signal and an output circuit providing an amplified alternating current output signal variable in accordance with changes of the input signal when the amplitude of the latter is above a predetermined control value, said transistor blocking said output signal when said input signal amplitude is below said control value, a load device sensitive to currents having amplitudes larger than a predetermined operating value, means coupling said transistor output circuit to said load device for transmitting said output signal thereto, and means including a direct current feedback circuit and applying to said input circuit a unidirectional conductive bias derived from said output signal and variable in magnitude directly with changes in the amplitude of said output signal, the input impedance of said transistor varying inversely with said conductive bias of said feedback circuit to cause the amplitude of current transmitted to said load device through said coupling means to change rapidly through said operating value in response to gradual changes of the amplitude of said input signal through said control value.

10. In a system for controlling the energization of a load device in response to changes in the amplitude of an input signal from an alternating current source, the combination of, a transistor having an input circuit coupled to said source to receive said input signal and an output circuit providing an amplified alternating current output signal varying in amplitude directly in accordance with changes in the input signal and changes in unidirectional conductive bias applied to the input circuit, means for coupling said output circuit to said load device and transmitting said alternating current output signal to the device, and feedback means applying to said input circuit a unidirectional conductive bias derived from said output signal and varying in magnitude directly with changes in the amplitude of the output signal, the input impedance of said transistor varying inversely with changes in the unidirectional conductive bias applied to said input circuit by said feedback means to cause the amplitude of said output signal to change abruptly in response to gradual changes in the amplitude of said input signal.

11. In a control system, a transistor having an input circuit extending between input and common electrodes and an output circuit extending between the common electrode and an output electrode and providing an amplified alternating current output signal variable in amplitude with changes in the amplitude of an alternating current input signal applied to the input circuit, a source of alternating current providing said input signal and coupled to said input circuit to apply such signal to the circuit, coupling means for transmitting said output signal while blocking direct current flow from said output circuit, a capacitor connected in a circuit between said input and common electrodes to bias the latter unidirectionally in a conductive direction and in an amount variable with the charge on the capacitor, and a charging circuit for said capacitor including a rectifier connected to said output circuit through said coupling means and polarized to pass current to said capacitor in the proper direction to increase the capacitor charge and said conductive bias applied to the input electrodes by the capacitor as the amplitude of said output current increases, the input impedance of said transistor varying inversely with changes of said conductive bias applied by said capacitor to cause the amplitude of successive cycles of said output current to increase progressively and at a fast rate in response to increase of the amplitude of said input signal at a slow rate.

References Cited in the file of this patent

UNITED STATES PATENTS

| | | |
|---|---|---|
| 2,731,558 | Anthun | Jan. 17, 1956 |
| 2,759,052 | MacDonald et al. | Aug. 14, 1956 |
| 2,764,688 | Grayson et al. | Sept. 25, 1956 |
| 2,787,707 | Cockburn | Apr. 2, 1957 |

OTHER REFERENCES

"A New Pocket Radio"; Radio and Television News; January 1955, page 54.

"Miniature Transistor Radio"; Electronic Design; December 1954, pages 20–21.